S. BROWN.
HAND PROPELLED VEHICLE.
APPLICATION FILED FEB. 28, 1921.

1,410,449.

Patented Mar. 21, 1922.
2 SHEETS—SHEET 1.

Witnesses
Geo. L. Lawrence
Arthur C. Wright

Inventor:
Stewart Brown,
By Charles Turner Brown,
Attorney.

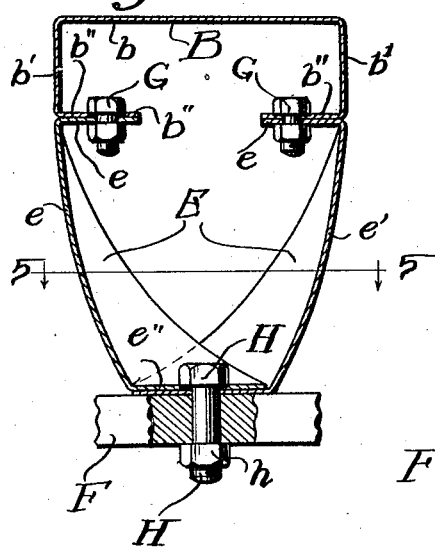
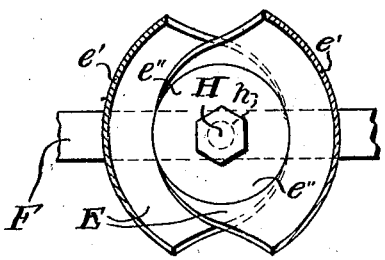
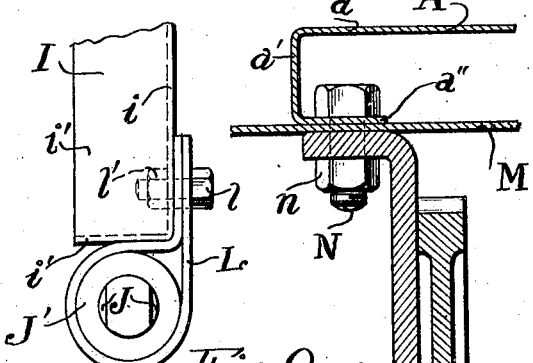
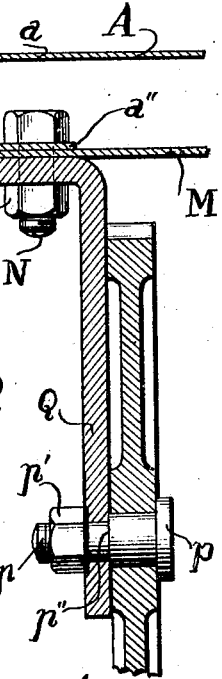
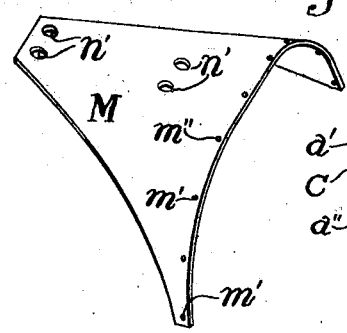

UNITED STATES PATENT OFFICE.

STEWART BROWN, OF CHICAGO, ILLINOIS.

HAND-PROPELLED VEHICLE.

1,410,449.    Specification of Letters Patent.    Patented Mar. 21, 1922.

Application filed February 28, 1921. Serial No. 448,730.

*To all whom it may concern:*

Be it known that I, STEWART BROWN, a citizen of the United States, and a resident of Chicago, in the county of Cook and State of Illinois, have invented certain new and useful Improvements in a Hand-Propelled Vehicle, of which the following, reference being had to the drawings accompanying and forming a part hereof, is a specification.

This invention relates to vehicles designed to be, primarily, propelled by children seated thereon, and which comprise a frame, axles, the forward one thereof being pivoted and serving as well a support for the feet of the driver and a means for guiding the course of the vehicle, wheels journalled on the front axle and additional wheels secured on the rear axle, to turn therewith, a seat, a lever provided with handles, a driving and a driven gear, and a connection between said lever and the driving gear.

Among the objects of the invention is to obtain a hand propelled vehicle of the kind recited which is strong and durable, not liable to be broken or bent out of shape; which is presentable in appearance, light in weight, adjustable for children of different sizes, and easily propelled.

In the drawings referred to Fig. 1 is a top plan view of the vehicle;

Figure 1:
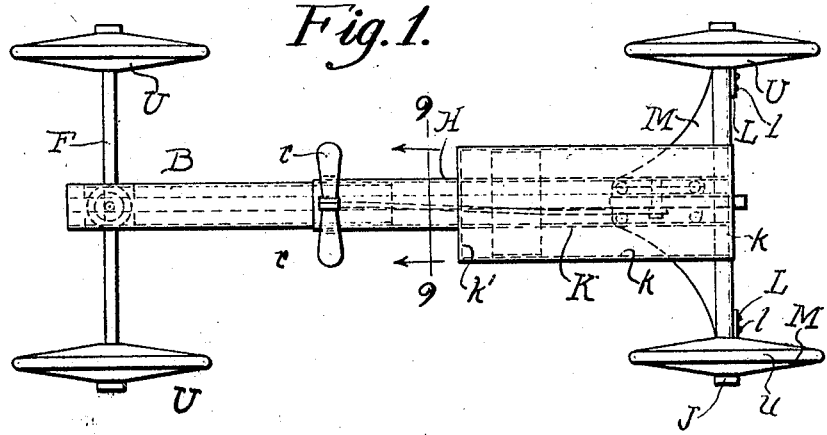
Figure 2:
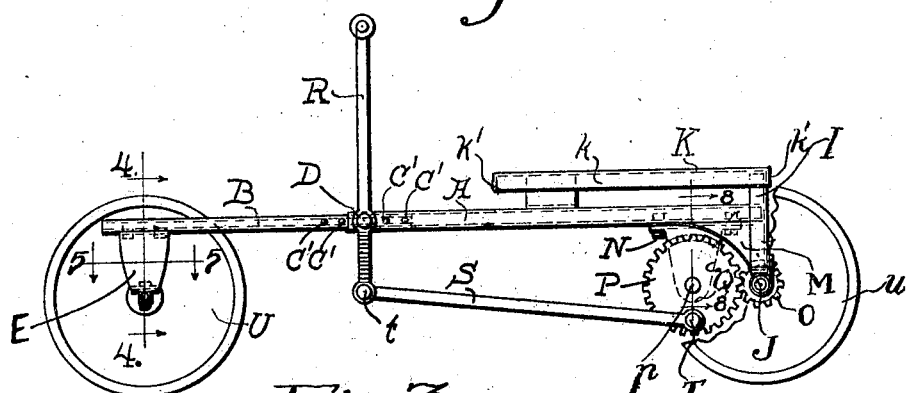
Fig. 2 is a side elevation with the wheels on one side of the vehicle removed.
Figure 3:
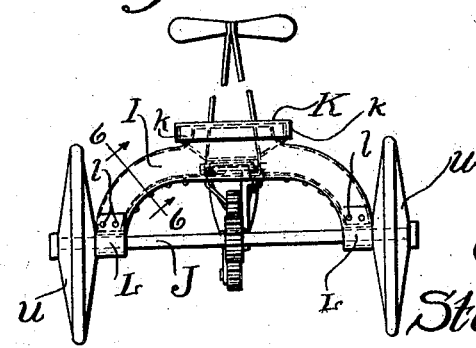
Fig. 3 is a rear elevation.

Fig. 4 a vertical section, on line 4—4 of Fig. 2, viewed as indicated by arrows;

Fig. 5 is a horizontal section, on line 5—5 of Figs. 2 and 4, viewed as indicated by arrows;

Fig. 6 is a section on line 6—6 of Fig. 3, viewed as indicated by arrows;

Fig. 7 is an end elevation of one end of the rear axle, a portion of the member supported thereby, and an edge view of the member connecting said axle and said supported member;

Fig. 8 a vertical section on line 8—8 of Fig. 2; viewed as indicated by arrows;

Fig. 9 a section on line 9—9 of Fig. 1, viewed as indicated by arrows;

Fig. 10 a perspective of a sheet metal brace forming an element in the construction of the rear end of the vehicle.

A reference character applied to designate a given part indicates said part throughout the several figures of the drawings wherever the same appears.

A, B, represent members which are adjustably joined to form a two part frame, both of said members being of sheet metal and respectively consisting of a horizontal body element, (*a*, *b*,), elements at right angles to said body element and integral therewith on the side edges thereof, (*a'*, *b'*,), and additional elements *a''*, *b''* integral with elements *a'*, *a'*, *b'*, *b'*, and parallel to the body elements *a*, *b*, forming flanges to said elements *a'*, *a'*, *b'*, *b'*.

Horizontal element *a*, of member A is of greater width than is element *b* of member B, and the elements *a'*, *a'*, of said member A are, respectively, of greater depth than are elements *b'*, *b'*, of said member B; so that the member B is, when said members are assembled, telescoped into the member A. Elements *a'*, *a'*, *b'*, *b'*, are respectively provided with apertures, C, C, and C', C'. There are a plurality of apertures C', C', in member B, and as the member B is pushed into or pulled out of member A, in making the required relative adjustment of said members for the use of the vehicle by a child of a given size, said apertures C', C', successively register with the apertures C, C, and when a suitable registration is made the pin or bolt D is forced through said registered apertures, to maintain said adjustment.

By referring to Fig. 9 it will be observed that the horizontal elements *a''*, *a''* form flanges which prevent the member B turning on the bolt D when said member B is telescoped into member A when said bolt is inserted as recited.

E represents a two-part pedestal, which is secured to member B, and extends from said member to the forward axle F. The parts of pedestal E are illustrated as duplicates formed up from sheet metal, to obtain the horizontal elements *e*, *e'*, and the connecting element *e''*. Said pedestal is secured in place on member B by bolts G, G, (Fig. 4). H represents a bolt which forms the king pin joining the axle F to pedestal E. Bolt H extends through horizontal elements *e''*, *e''*, and said bolt is illustrated as held in place by the nut *h*, thereby holding said pedestal and axle in determined relative position.

I represents an arch shaped member which is arranged to maintain the rear ends of member A, and seat K, and the journal bearings J', J', of axle J in their predetermined relative positions. Seat K is illustrated as made of sheet metal formed up to obtain a body part, sides k, k, and ends k', k'; member I is also made of sheet metal formed up to obtain flanges i', i'', and connecting web i. Journal bearings J', J', are illustrated as non-rotatably secured by means of straps L, L, and bolts l, l, (Figs. 3 and 7), to the ends of arch shaped member I.

To render the joining of the arch shaped member I to the rear end of member B and seat K strong and rigid the brace member M, (illustrated in perspective in Fig. 10), is secured to the lower flange i'' of member I, by rivets m, m, m, extending through apertures m', m', in said member M, and through corresponding apertures in said lower flange i'' of member I; and said member M is secured to elements a'', a'' of member A, by bolts N and nuts n, (see Fig. 8); said bolts extending through apertures n', n' in member M, and through corresponding apertures in flanges a'', a''.

Q represents a gear wheel which is rigidly secured on axle J, and P represents a gear wheel which is rotatably mounted on pivot p so that the teeth thereof engage with the teeth on wheel O. Pivot p is rigidly secured in bracket Q, by nut p' drawing shoulder p'' into close contact with said bracket. Bracket Q is secured to member A and brace member M by the bolts N, hereinbefore mentioned, and nuts n, (see Fig. 8).

R represents a lever which is fulcrumed on the bolt D, hereinbefore set forth; r, r, represent handles in lever R, and S a connection which is mounted at one end thereof on pivot T, and at the other end on lever R by pivot t.

U, U, represent vehicle wheels which are rotatably mounted on axle F, and u, u, vehicle wheels which are rigidly mounted on axle J.

To operate the vehicle a child should be seated on seat K, with feet on axle F and hands, or one thereof, on handles r, r, (or r). If required one of the vehicle wheels u, u, is turned, say by one of the child's hands, until the lever R can be turned or rocked, on pivot formed by bolt D. Subsequent rocking of lever R on said pivot propels the vehicle, and the feet on axle F are moved to turn the axle on its king pin H, to guide it.

I claim;

1. In a hand propelled vehicle, a frame comprising sheet metal members respectively consisting of horizontal elements, elements at the edges of, perpendicular to, and integral with said horizontal elements, and additional elements forming flanges at the edges of and integral with said perpendicular elements, said flanges parallel to said horizontal elements, said members longitudinally movable one within the other, to adjustably position said members, and means to maintain said members in said adjusted position, all combined as set forth in combination with an arch shaped member comprising flanges, and a connecting web, and means to secure the rear end of one of said frame members to one of the flanges of said arch shaped member.

2. In a hand propelled vehicle, a frame consisting of sheet metal members respectively comprising horizonal elements, vertical elements and additional horizontal elements, all the elements in a given member integral, in combination with an axle and a two part pedestal, said pedestal comprising an upper and lower horizontal elements and a connecting element, bolts extending through said upper horizontal elements and through the additional horizontal element of one of said first sheet metal members, to rigidly join said pedestal and said member, and a bolt extending through the lower horizontal element and said axle.

3. In a hand propelled vehicle, sheet metal members adjustably joined to form a two part frame and means to maintain said members in adjusted relation, in combination with an arch shaped member comprising flanges and a connecting web; means to secure the rear end of one of said frame members to said arch shaped member, a brace member and means to attach said brace member to one of the flanges of said arch shaped member, axle bearings, straps securing said bearings to said arch shaped member, and an axle rotatably mounted in said bearings.

4. In a hand propelled vehicle, sheet metal members adjustably joined to form a two part frame and an additional member arranged to form a seat, means to maintain said sheet metal members in an adjusted relation, in combination with an arch shaped sheet metal member comprising flanges and a connecting web, means to secure the rear ends of said seat member and one of said sheet metal members to said arch shaped member, in combination with a sheet metal brace member, means to secure said brace member to one of the flanges of said arch shaped member, axle bearings secured to the ends of said arch shaped member, and an axle rotatably mounted in said bearings.

STEWART BROWN.

Witnesses:
CHARLES TURNER BROWN,
B. S. BROWN.